United States Patent [19]
Uehara et al.

[11] 3,904,739
[45] Sept. 9, 1975

[54] METHOD OF OXIDIZING AND/OR RECOLLECTING WATER- SOLUBLE AND/OR WATER-DECOMPOSABLE SUBSTANCES INCLUDED IN THE AIR AND APPARATUS FOR PERFORMING THE SAME

[75] Inventors: Hiromichi Uehara; Satoshi Arimitsu, both of Sagamihara; Yasuharu Ijuin, Kodaira, all of Japan

[73] Assignee: Sagami Chemical Research Center, Tokyo, Japan

[22] Filed: Sept. 10, 1973

[21] Appl. No.: 395,844

[30] Foreign Application Priority Data
Sept. 13, 1972 Japan.............................. 47-91189
Sept. 13, 1972 Japan.............................. 47-91190

[52] U.S. Cl............. 423/400; 23/232 R; 23/252 R; 23/254 R; 23/284; 55/68; 423/239
[51] Int. Cl.².. B01D 53/04; B01J 1/14; C01B 21/36
[58] Field of Search.......... 23/232 R, 254 R, 252 R, 23/284; 55/DIG. 15, 68, 74, 208, 387; 62/8, 12, 18; 73/23 (U.S. only); 423/239, 400

[56] References Cited
UNITED STATES PATENTS
| | | | |
|---|---|---|---|
| 879,129 | 2/1908 | Dewar | 62/18 X |
| 1,057,052 | 3/1913 | Guye | 62/18 |
| 2,376,145 | 5/1945 | Horvitz | 23/254 R |
| 2,465,229 | 3/1949 | Hipple, Jr. | 55/DIG. 55 |
| 2,506,806 | 5/1950 | Metzger | 23/254 R X |
| 2,601,272 | 6/1952 | Frost, Jr. | 73/23 |
| 3,226,197 | 12/1965 | Lewis | 23/254 R X |
| 3,352,644 | 11/1967 | Lysyj | 23/232 R |
| 3,718,429 | 2/1973 | Williamson, Jr. | 23/232 R |
| 3,735,558 | 5/1973 | Skarstrom et al. | 55/16 |

*Primary Examiner*—Joseph Scovronek
*Attorney, Agent, or Firm*—Oblon, Fisher, Spivak, McClelland & Maier

[57] ABSTRACT

Water-soluble and/or water-decomposable substances in polluted air, such as nitrogen oxides and isocyanates etc. are cold-trapped by making the polluted air in contact with phosphorous pentoxide cooled to a temperature at or below which the substances are solidified, and, by heating the phosphorous pentoxide to the normal temperature, the trapped substance is recollected. When the polluted air includes nitrogen monoxide (nitric oxide), it is oxidized and recollected as gaseous nitrogen dioxide through the same steps as in the latter case.

5 Claims, 4 Drawing Figures

NO₂

1 ppm/scale

NO₂

2.5 ppm/scale

METHOD OF OXIDIZING AND/OR RECOLLECTING WATER-SOLUBLE AND/OR WATER-DECOMPOSABLE SUBSTANCES INCLUDED IN THE AIR AND APPARATUS FOR PERFORMING THE SAME

The present invention relates to a method of oxidizing and/or recollecting water-soluble and/or water-decomposable substances included in the air and an apparatus for performing the same.

The pollutants in polluted gas, such as stack gas, exhaust gas of automobile and polluted air on city, are peroxides, isocyanates, sulfur dioxide, nitrogen oxides etc. and many of them are water-soluble and/or water-decomposable substances.

The measurements of such air polluting substances have not been performed precisely due to some problems and one of the problems which is the most important is the decomposition of the substances by water condensed during the sampling and/or the condensation of the substances. Therefore, the technique for properly collecting the water-soluble or water-decomposable substances in air is very important in view of the quantitative measurement thereof as well as the condensation thereof. The amount of polluting substances in air is generally very small as in the order of ppb.

In general, if the polluted air were cooled down to, for example, the dry-ice temperature ($-78.5°C$) or the liquid nitrogen temperature ($-196°C$) and then heated to the normal temperature, the water soluble and/or water-decomposable substances, such as nitrogen oxides or isocyanates which had existed prior to the cooling would disappear. This would be caused by the fact that they react with the condensed water deposited on a wall surface of the cooler as follows:

for $NO_2$, $$2NO_2 + H_2O \rightarrow HNO_3 + HNO_2$$

and, for isocyanates, $$RNCO + H_2O \rightarrow RNHCO_2H \rightarrow RNH_2 + CO_2$$

$$RNCO + RNH_2 \rightarrow RNHCONHR$$

Particularly, as to nitrogen dioxide ($NO_2$) which is an important pollutant, the technique for trapping it is very important because the limit of concentration of $NO_2$ which can be measured by the conventional apparatus such as NDUV (Non-Dispersive Ultra Violet analyser) etc. is in the order of 200 ppm and, therefore, low concentration $NO_2$ samples have not been measured quantitatively due to the lack of suitable condensation technique.

The above reaction of $NO_2$ with the condensed water is very rapid. $NO_2$ in polluted air, when (cold) adsorbed in a molecular sieve, cannot be desorbed therefrom even when it is heated.

There has not been developed any technique to cold-trap water decomposable substances existing in polluted air. In order to realize such technique, it would be required to completely remove water content from the air in taking consideration of the above fact. However, the sample cannot be dehydrated even when it is made in contact with a desiccating agent such as phosphorus pentoxide, calcium chloride etc. at normal temperature. For this reason, such water-decomposable substances cannot be recollected by merely dehydrating at normal temperature and then cold-trapping the substances.

The present inventors have found that, by making the polluted air sample in contact with a desiccating agent, such as phosphorus pentoxide, calcium chloride etc. cooled down to a low temperature such as the liquid nitrogen temperature or the dry-ice temperature such that the sample does not contact with the cooled portions other than the cooled desiccating agent, the sample is solidified on the desiccating agent while all of the water content of the sample thus cooled and solidified reacts with the desiccating agent completely and disappears, leaving the water-decomposable substances on the surface of the desiccating agent, and that, when the solidified substances are vaporized by, for example, heating it to the normal temperature, the water-decomposable substances can completely be recovered. For example, when the desiccating agent is cooled to the liquid nitrogen temperature ($-196°C$), the water-decomposable substances in air, whose concentrations are in the order of ppb, can generally be completely recollected. That is, it has been found that by cooling the desiccating agent to or below a temperature at which the water-decomposable substances are solidified, the temperature being dependent on the pressure and the concentration of the sample, the water content which is also solidified is completely removed and the water-decomposable substances can be cold-trapped and that, thereafter, by heating the desiccating agent to the normal temperature, the trapped decomposable substances can be quantitatively recovered in the gas phase. For example, since the vapor pressure of $NO_2$ at $-100°C$ corresponds to several ppm and at $-120°C$, 0.4 ppm, a polluted air sample containing 4 ppm $NO_2$ can be quantitatively measured with error $\pm 10$ percent. For a lower concentration sample, it may be sufficient to use a lower temperature (such as liquid nitrogen temperature). The recovery of, for example, $NO_2$ is complete and it has been found that the recovery rate of $NO_2$ of in the order of ppm at $-150°C$ is 100 $\pm$ 2 percent.

Therefore, an object of the present invention is to provide a novel and improved method of recollecting water-soluble and/or water-decomposable substances in polluted air which utilizes a cold-trapping technique.

Another object of the present invention is to provide a novel and improved apparatus for performing the present method.

An application of the present recollecting method to oxidize NO to $NO_2$ is easily performed as follows: NO is converted to $NO_2$ through a reaction, $2NO + O_2 \rightarrow 2NO_2$(liquid). Although the higher rate of the above reaction is at the lower temperature, the probability of the conversion at a temperature higher than $-183°C$ at which oxygen is liquefied is small because the reaction becomes a gaseous three-body collision reaction and thus the reaction rate cannot be so fast. However, the small rate due to this phenomenon can be easily improved by the reaction of NO with liquid oxygen. Occasionally, the $NO_2$ in a mixture sample of NO and $NO_2$ is required to be recovered selectively. In such case, the small rate of the gaseous three-body collision reaction is effectively used to improve the erroneous recovery of $NO_2$ by making the reaction probability small by means of a suitable reduction of the sample pressure.

On the other hand, nitrogen monoxide (nitric oxide) in polluted air is frequently measured after a conversion of it to nitrogen dioxide. As the oxidation method for this purpose, those using a solution such as potassium permanganate-sulfuric acid solution etc. or using a solid oxidizing agent such as chromium trioxide etc. have been known. Either of these oxidation methods has an advantage that the required time is relatively short. However, they both are not so reliable because they have disadvantages that reproducibility is bad, the effect of humidity is severe and the duration of the agent is short.

Another method which has been known is one using gaseous oxidizing agent such as oxygen or ozone. However, if NO in air should be converted to $NO_2$ through the use of gaseous oxygen, it will be necessary to put NO in the gas for at least 24 hours and this is not practical method.

A further object of the present invention is to provide a novel and improved method of oxidizing NO to $NO_2$.

The inventors have found that NO in polluted air can be oxidized by especially liquid oxygen at very high rate and it can be recollected completely as $NO_2$.

In order to perform this oxidation method, it is sufficient to make a polluted air sample containing NO in contact with a desiccating agent such as phosphorus pentoxide cooled down to a temperature at or below which oxygen is liquefied, such as liquid nitrogen temperature ($-196°C$), as in the case previously mentioned. Since the reaction between oxygen at such low temperature and NO also at a low temperature is very fast, NO in air can be oxidized completely within a short time such as a few minutes. Since the resulting $NO_2$ is solidified on the surface of the cooled desiccating agent as said previously, NO in air can be completely recollected as $NO_2$ by heating the agent to the normal temperature. According to this oxidation method, NO in air can be completely recovered as $NO_2$ by merely making the sample in contact with the cooled desiccating agent.

In order that the invention may be clearly understood, it will now be described, by way of example, with reference to the accompanying drawings, wherein.

Figure 1:
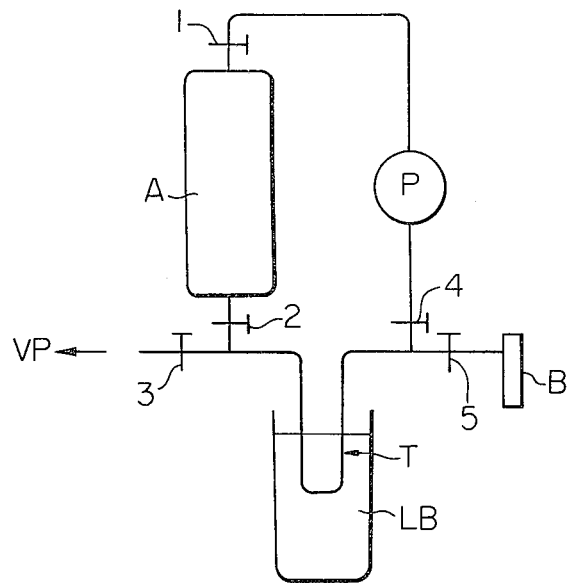
FIG. 1 is a schematic illustration of an apparatus for performing the present method.
Figure 2:
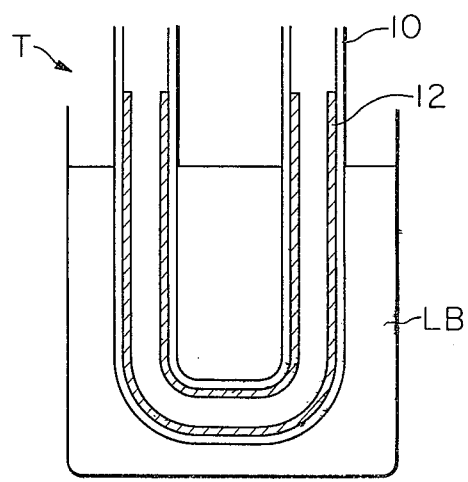
FIG. 2 is a cross sectional view of an example of a cooling trap used in the apparatus in FIG. 1.

Returning to FIGS. 1 and 2, there is shown an embodiment of the present invention. Considering, for example, $NO_2$, a polluted air sample containing $NO_2$, at normal pressure, is introduced into a sample cell A. The sample is recirculated through a cooling trap T by closing cocks 3 and 5, opening cocks 1, 2 and 4 and energizing a circulator pump P. The structure of the cooling trap T is shown in cross section in FIG. 2. As shown, the cooling trap T comprises a U shape tube 10, on the inner wall of which a layer 12 of a suitable desiccating agent such as phosphorus pentoxide is vapor-deposited, and a low temperature bath LB by which the tube 10 and hence the layer 12 is cooled to a low temperature such as the liquid nitrogen temperature or the dry-ice temperature. During the recirculation of the sample through the cooling trap T, $NO_2$ in the sample is cooled and solidified on the layer 12. At the same time, the water content of the sample is also cooled but disappears before it reacts with $NO_2$. Thereafter, the cocks 2 and 4 are closed and the cock 3 is opened to exhaust the U tube 10 by a vacuum pump VP to thereby remove undesired substances from the tube 10. After the tube 10 is evacuated, the cock 3 is closed and then the cooling effect of the low temperature bath LB is removed. Then the U tube 10 is heated to the normal temperature. After the heating, the cock 5 is opened so that the gas, i.e., $NO_2$ generated by the heating is introduced into a sample cell B which had been evacuated. If necessary, the sample cell B may be cooled to the liquid nitrogen temperature to recollect vaporized $NO_2$ completely.

In this manner, all of $NO_2$ in the sample cell A having a relatively large volume can be transferred completely to the sample cell B having a smaller volume.

If the polluted air sample includes NO, NO will be converted to $NO_2$ as mentioned previously. Therefore, it will be recollected completely in the sample cell B as $NO_2$.

Figure 3:
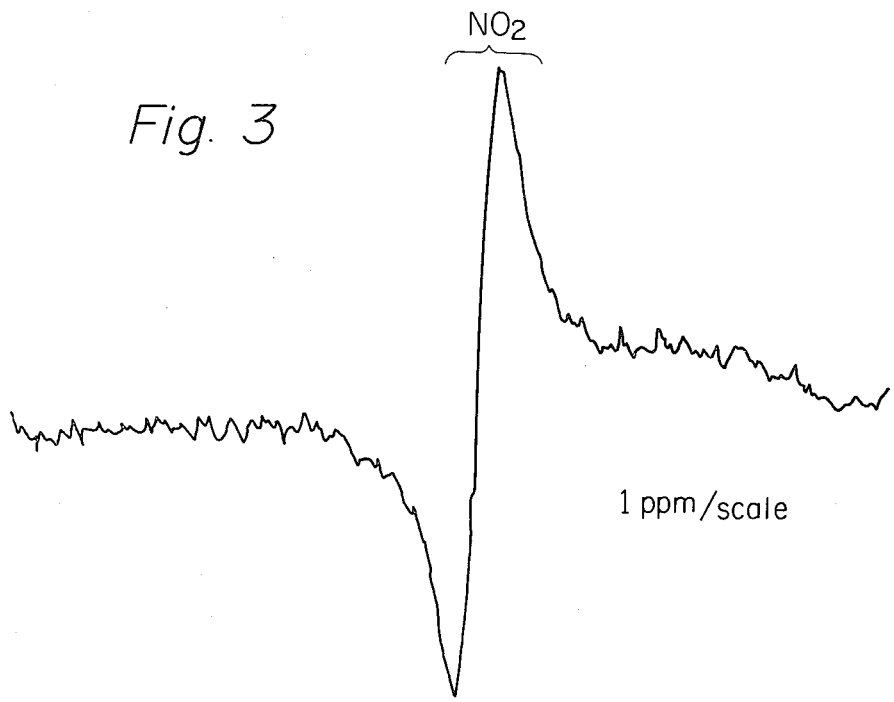
FIG. 3 is a graph showing a spectrum of $NO_2$ recollected by the present invention.

FIG. 3 shows the EPR spectrum of $NO_2$ in an air sample in which the present method of analysis was applied. The spectrum was obtained by using this air sample in an EPR cavity resonator whose cavity volume was 10 cc. In this case, the cavity was used as sample cell B and the volume of sample cell A was 1 lit. The sample air was first collected in the sample cell A and cold-trapped $NO_2$ in the air was introduced into the cavity in the manner previously mentioned. The concentration of $NO_2$ in the sample collected in the sample cell A was 8 ppm and the spectrum obtained corresponds exactly to 800 ppm.

According to this method, the quantitative measurement of $NO_2$ in the polluted air will be easily performed precisely with the concentration of it up to 10 ppb.

Figure 4:
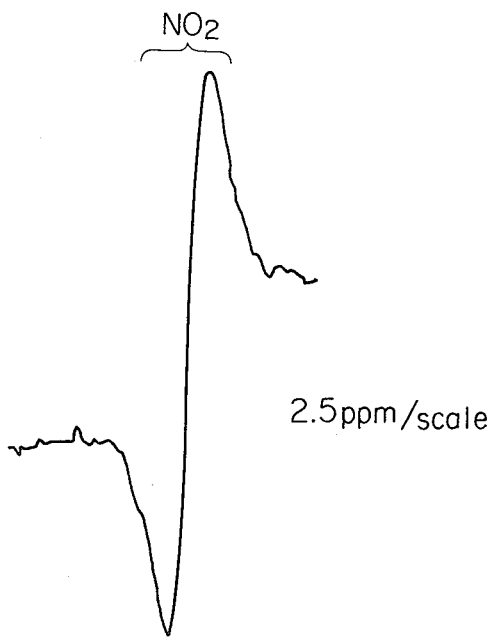
FIG. 4 is a graph showing another spectrum of $NO_2$ which is converted from NO and recollected in accordance with the present invention.

FIG. 4 shows an EPR spectrum when a gas containing 19 ppm NO is converted to $NO_2$ and resulting $NO_2$ is measured with the same apparatus as in the latter case. The spectrum of $NO_2$ shown in FIG. 4 corresponds exactly to 1,900 ppm and thus it is clearly shown that NO in the sample was completely oxidized and recollected completely as $NO_2$.

From the foregoing, it will be appreciated that a new method of oxidizing and/or recollecting and/or condensing water soluble and/or water decomposable substances and an apparatus for performing the same have been provided. As to the cooling trap, it should be understood that although one of a U shape tube type has been shown, it may be possible to form the trap with other configurations so long as the sample gas passing through the trap contacts with only the cooled desiccating agent and does not contact with any other cooled portion thereof.

What is claimed is:

1. A method of collecting gaseous water decomposable nitrogen oxides contained in a sample gas including water, comprising the steps of adsorbing nitrogen oxides contained in the sample gas on phosphorus pentoxide cooled to or below a temperature at which nitrogen oxides are solidified, vaporizing the nitrogen oxides solidified on the phosphorus pentoxide and collecting the vaporized nitrogen oxides.

2. A method of collecting gaseous water decomposable nitrogen oxides contained in a sample gas including water, comprising the steps of collecting the sample gas in a first sample cell, recirculating the sample gas in the first sample cell through a recirculation path including a circulating pump and a low temperature trapping means containing phosphorus pentoxide as desiccant, said desiccant cooled to or below a temperature at which nitrogen oxides are solidified, heating the desiccant to vaporize the solidified nitrogen oxides and collecting the vaporized nitrogen oxides in a second sample cell having a smaller volume than that of said first sample cell.

3. A method of oxidizing nitrogen monoxide in polluted air and collecting the resulting nitrogen dioxide, comprising the steps of sampling the polluted air in a first sample cell, adsorbing nitrogen monoxide contained in the sampled air on phosphorus pentoxide cooled to or below a temperature at which oxygen from the air is liquefied, reacting the oxygen with the nitrogen monoxide to thereby convert the nitrogen monoxide to nitrogen dioxide, trapping the resulting solid nitrogen dioxide in the phosphorus pentoxide under normal pressure, heating the phosphorus pentoxide to vaporize the nitrogen dioxide and collecting the vaporized nitrogen dioxide in a second sample cell.

4. An apparatus for oxidizing nitrogen monoxide in a sample of air and collecting the resulting nitrogen dioxide, comprising a first sample cell having a pair of holes; a circulator pump having one end connecting one of said holes of said first sample cell; a cooling trap means having one end connecting the other end of said pump and the other end connecting to the other hole of said first sample cell, said cooling trap means having therein phosphorus pentoxide as a desiccating agent, and cooled to a temperature at which the oxygen from the air is liquefied; a second sample cell; a heating means for heating said cooling trap at desired times; means for completing a circulation path through said first sample cell, said cooling trap and said pump; valve means for disconnecting said cooling trap from said circulation path and connecting said cooling trap to said second sample cell.

5. The apparatus set forth in claim 4, wherein said cooling trap means comprises a low temperature bath and a container immersed in said bath, said container having a gas inlet and a gas outlet and the inner wall thereof being provided with a deposition layer of phosphorus pentoxide, said layer being deposited on the entire portion of the inner wall which is immersed in the bath so that when cooled by said low temperature bath, the sample gas passing through said container does not contact with cooled portions thereof other than said cooled phosphorus pentoxide.

* * * * *